M. HARLOE.
FAUCET FILTER.
APPLICATION FILED MAY 14, 1910.
989,965.
Patented Apr. 18, 1911.
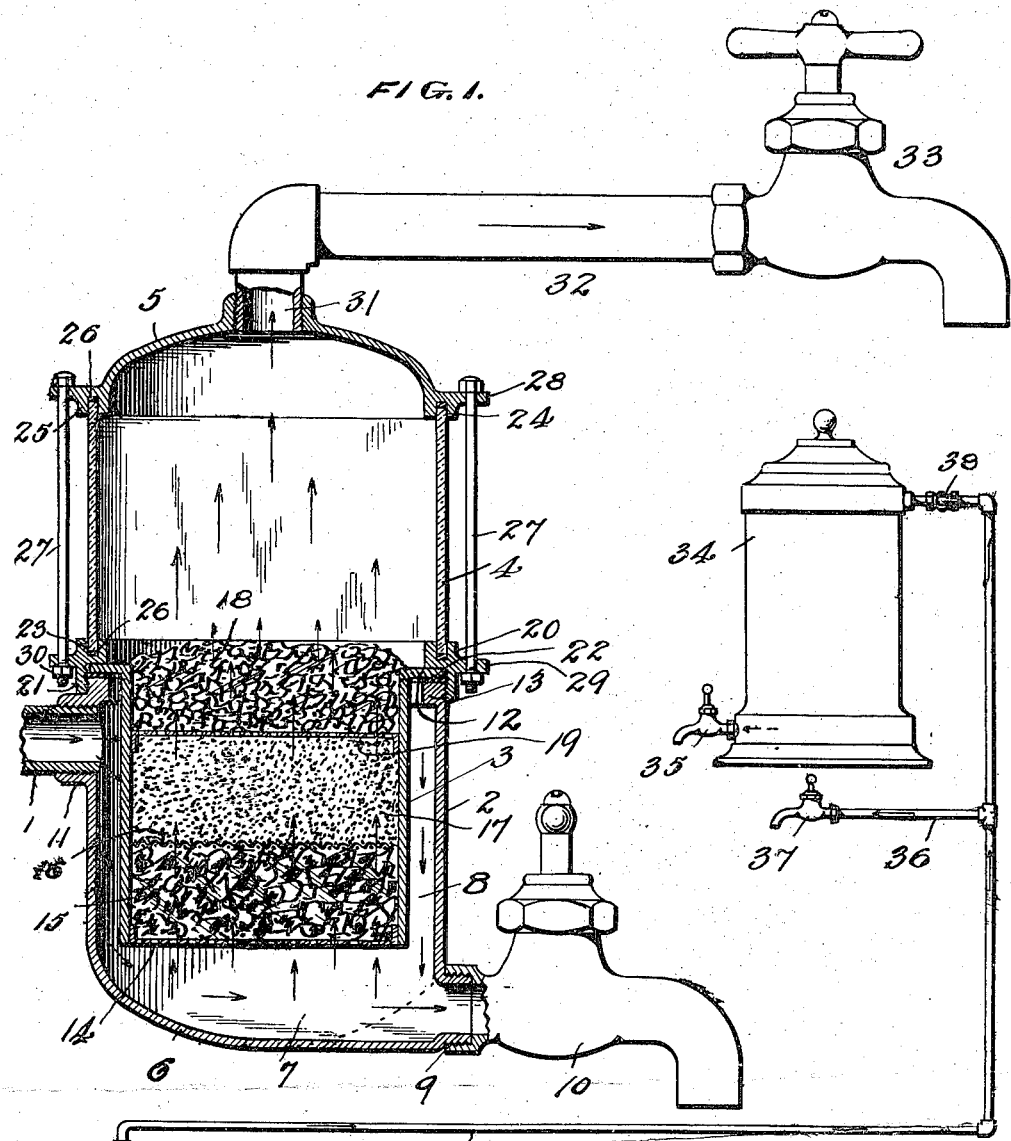
WITNESSES
INVENTOR
Morton Harloe
by Chas. K. Davies
Attorney

UNITED STATES PATENT OFFICE.

MORTON HARLOE, OF HAWLEY, PENNSYLVANIA, ASSIGNOR TO CRYSTAL MANUFACTURING AND PATENT COMPANY, OF HAWLEY, PENNSYLVANIA.

FAUCET-FILTER.

989,965.  Specification of Letters Patent.  Patented Apr. 18, 1911.

Application filed May 14, 1910. Serial No. 561,502.

*To all whom it may concern:*

Be it known that I, MORTON HARLOE, a citizen of the United States, residing at Hawley, in the county of Wayne and State of Pennsylvania, have invented new and useful Improvements in Faucet-Filters, of which the following is a specification.

The present invention relates to improvements in water purification especially as embodied in that type of filters known as faucet filters.

The object of the invention is the provision of a filter of this character which is simple in construction, applicable with facility for use, composed of comparatively few parts thus guarding against derangement or displacement of its elements, but rendering its operation more efficient, and, as the device is comparatively cheap in first cost and inexpensive in maintenance a desirable household article is thus provided.

There are several meritorious features present and provided for in the device, for instance an upward flow of water through the filtering material by which the objectionable and detrimental accumulation of sediment is prevented; unfiltered water, when desirable, may be taken from the filter under certain conditions and for certain purposes, and this operation also provides a medium by which the filter may be washed and the filtering material drained.

The invention consists essentially in a casing inclosing certain filtering materials and provided with an unfiltered-water chamber and an outlet therefrom; and a filtered-water chamber also provided with an outlet; and in further details of construction and combinations of elements as will be more clearly pointed out hereinafter.

In the accompanying drawings I have illustrated one example of the physical embodiment of my invention, and an additional application thereof, constructed according to the best modes I have so far devised for the practical application of the principles of the invention.

Figure 1 shows a central vertical sectional view of the filter, complete, having applied thereto a faucet for filtered water and a second faucet for unfiltered water, the device being shown as applied to an outlet of the usual water pipe. Fig. 2 illustrates the application of the invention by means of which filtered water, either cooled, or at normal temperature may be obtained, or unfiltered water may be taken from the filter.

The device is applied, or is applicable to any waterpipe outlet, and as here illustrated (Fig. 1) the usual faucet has been displaced and the device interposed and shown as fixed to the water outlet pipe 1.

The filter casing proper is composed of the metallic cup 2, an inner cylindrical receptacle 3, the glass reservoir 4 and the cap or dome 5. The casing or cup 2 is formed with a rounded bottom 6 which forms a chamber 7 below the inner receptacle 3 and an unobstructed annular space 8, between the outer and inner casings, is in open communication with the chamber 7. At its front lower end the casing 2 is fashioned with an integral open boss 9, threaded on its exterior for the reception of the threads of the faucet 10, and through this faucet, when desired, unfiltered water may be drawn. An interiorly threaded boss 11 is formed at the rear upper end of the cup 2, by means of which the device may be screwed to the water pipe 1, thus providing an inlet for the water from the service pipe.

The cylindrical receptacle 3 is composed of impervious material, preferably provided with a polished outer surface and formed with an external flange or head 12. This flange or head is seated upon a complementary flange 13 formed at the upper end of the cup 2, and by this means the inner receptacle is secured in position and depends within the outer cup 2. The filter receptacle 3 is open at the top, but is closed at the bottom by a perforated plate 14 which supports a layer of charcoal 15. Above the charcoal I interpose an open screen 16 upon which is supported a layer of sand or like material, as 17, and between this sand and the top filtering bed of gravel 18, I locate a second perforated plate 19.

Superposed on the casing or cup 2 is a metallic ring 20 which is formed with a threaded depending flange 21 adapted to screw over complementary threads cut in the outer surface of the upper end of the cup 2, and to make a water tight joint between the cup and ring I interpose the gasket 22, between flanges 12 and 13 of the receptacles. An open annular recess 23 in the upper face of the ring 20 forms a seat for the lower end of the glass reservoir 4, and a complementary recess 24 formed in the underside of a flange 25, depending from the cap plate 5 incloses the upper end of the glass 4, gaskets 26, 26 being provided to prevent leak of the water in its passage through the reservoir.

The cap plate 5 and the ring 20 are tightly clamped and held together by means of a series of bolts or threaded rods 27. These bolts pass through flanges 28 and 29 on the cap plate and ring respectively, and are secured by nuts 30. In this manner a rigid connection is provided between the parts of the upper portion of the filtering device.

An outlet is provided from the filtered-water reservoir through the tubular boss 31 in the cap plate. This boss is threaded to receive the end of the outlet pipe 32, which is usually provided with a faucet 33.

In Fig. 2 I have illustrated an exemplification of an extension of the filtering device, embracing the outlet pipe 32 which leads to a water cooler 34 provided with an outlet or faucet 35. An additional connection 36 is cut into the pipe 32 and a faucet 37 secured thereto from which water at normal temperature may be drawn.

The passage of the water through the filter is indicated by arrows. The water entering through the inlet pipe 1 passes around the exterior of the inner receptacle 3 through the space 8, and if desired may be drawn, in unfiltered condition through the faucet 10. To draw filtered water, the faucet 10 is shut off, as shown in Fig. 1. Under this condition the water flows through inlet pipe 1, space 8 and chamber 6, then upwardly through the perforated plate 14, the charcoal bed 15, screen 16, the sand bed 17, perforated plate 19 and the gravel bed 18 to the reservoir within the glass receptacle 4, from where it may be drawn through the outlet pipe 32 and faucet 33. In its passage through the several filtering beds and screens the water is cleansed of impurities and is held in a pure state in the glass receptacle 4.

A striking and valuable feature of the invention is the upward flow of the water while being filtered, whereby the impurities are left below the pure water, and the faucet 10 provides a means, by which the impurities may be drawn from the device. Thus by closing the faucet 33 and opening the faucet 10, the passage of the water through pipe 1, space 8, chamber 7 and outlet boss 9, serves to wash the walls of the receptacles of any sediment that may possibly have accumulated, but the constant drawing of water for household purposes, other than for drinking, through the faucet 10, serves to maintain a sanitary condition in the filter, without special attention.

Having thus fully described my invention, what I claim as new and desire to secure by Letters Patent is:—

1. The combination in a faucet filter of a cup and an open receptacle containing filtering beds and supported in said cup, and a foraminous bottom to said receptacle; the dimensions and arrangement of said cup and receptacle forming a chamber around and below the receptacle having inlet and outlet openings and providing unimpeded passage of liquid from the inlet to the outlet, a receptacle for filtered water closing the space above the filtering beds, and means forming a joint between said cup and two receptacles.

2. The combination in a faucet filter of a cup formed with an interior flange, an open receptacle having a foraminous bottom and containing filtering beds, and provided with an exterior flange supported upon said cup flange, the dimensions and arrangement of said cup and receptacle forming a chamber around and below the receptacle having inlet and outlet openings and providing an unimpeded passage from said inlet to the outlet, a ring secured to the cup bearing upon said flanges and formed with an annular groove, a cap plate provided with a complementary groove and formed with an opening, a filtered water receptacle seated in said grooves, and flanges on said ring and plate connected by securing bolts.

In testimony whereof I have hereunto set my hand in presence of two subscribing witnesses.

MORTON HARLOE.

Witnesses:
S. A. HARRIS,
M. H. TURNER.